United States Patent [19]

Rae

[11] Patent Number: 5,479,866

[45] Date of Patent: Jan. 2, 1996

[54] PORTABLE TABLE APPARATUS

[76] Inventor: Steven P. Rae, 4359 Hwy. 138, Oregon, Wis. 53575

[21] Appl. No.: 215,230

[22] Filed: Mar. 21, 1994

[51] Int. Cl.[6] ................................................. A47B 37/00
[52] U.S. Cl. .............................................. 108/44; 108/25
[58] Field of Search ............................... 108/44, 43, 46, 108/48, 25; 248/214, 231.8; 224/42.07, 42.03 A, 42.01

[56] References Cited

U.S. PATENT DOCUMENTS

| | | | |
|---|---|---|---|
| 183,323 | 10/1876 | Park et al. | 108/25 |
| D. 332,527 | 1/1993 | Szablak et al. | |
| 1,830,347 | 11/1931 | Camden et al. | 108/44 X |
| 2,228,203 | 1/1941 | Hoffmann. | |
| 2,643,395 | 6/1953 | Stassinos. | |
| 2,721,777 | 10/1955 | Willis | 108/44 |
| 2,953,287 | 9/1960 | Werner. | |
| 3,163,338 | 12/1964 | Gottsegen | 224/42.01 |
| 3,394,666 | 7/1968 | Pearlman. | |
| 3,701,576 | 10/1972 | Moen | 108/43 X |
| 3,709,159 | 1/1973 | Oglesby, Jr.. | |
| 3,922,973 | 12/1975 | Sturgeon | 108/44 X |
| 3,923,356 | 12/1975 | Washburne | 312/244 X |
| 4,089,554 | 5/1978 | Myers. | |
| 4,320,862 | 3/1982 | Bettenhausen | 224/42.03 A |
| 4,437,714 | 3/1984 | Struck | 108/25 X |
| 4,455,948 | 6/1984 | Torres. | |
| 4,830,242 | 5/1989 | Painter. | |
| 4,887,526 | 12/1989 | Blatt. | |
| 4,969,678 | 11/1990 | Loisel. | |
| 5,090,335 | 2/1992 | Russell. | |
| 5,092,507 | 3/1992 | Szablak et al.. | |
| 5,215,346 | 6/1993 | Reitzloff et al.. | |
| 5,246,151 | 9/1993 | Jabara | 224/42.01 X |
| 5,294,027 | 3/1994 | Plastina | 224/42.01 X |

FOREIGN PATENT DOCUMENTS 196741  3/1923  United Kingdom ............... 108/25

Primary Examiner—Laurie K. Cranmer
Assistant Examiner—Janet M. Wilkens
Attorney, Agent, or Firm—DeWitt Ross & Stevens

[57] ABSTRACT

An improved portable table apparatus is presented which may alternatively be used with a motor vehicle. The portable table apparatus includes a tray member, a planar cover member which is slidably engaged over the tray member, and two adjustable leg members located on opposite ends of the tray member. In an alternative embodiment, one leg member of the portable table is replaced with means for attaching that end of the portable table to the trunk rim or trunk area of a motor vehicle.

23 Claims, 5 Drawing Sheets

PORTABLE TABLE APPARATUS

FIELD OF THE INVENTION

The present invention relates generally to the field of portable recreational equipment. More particularly, the present invention relates to a freestanding portable table which may alternatively be attached to the tailgate or trunk area of a vehicle. The portable table creates a flat table surface area along with various compartments and holders for accommodating a variety of items.

DESCRIPTION OF THE PRIOR ART

Portable tables have long been used at sporting event parking lots, campsites, worksites, and other areas to provide a surface for eating, playing, or working. Moreover, barbecue tables which attach to a support on one end and contain hinged, retractable legs on an opposite end are well known in the art.

Various types of designs for portable tables currently exist. U.S. Pat. No. 3,394,666, to Pearlman, discloses a folding table apparatus that consists of a frame supporting the table top along with drawer storage compartments and foldable legs. The folding table apparatus is designed to rest on a trunk tailgate on one end with retractable legs extending downward from the opposite end to support the table apparatus above the ground. The legs are pivotally mounted and unfold from lateral storage compartments located on opposite sides of the frame.

U.S. Pat. No. 3,709,159, to Oglesby, describes a folding table which is supported at one end by an automobile and at its opposite end by foldable legs. At that end supported by the automobile, the table is connected to a trunk lock socket at one end and securely anchored. The securing mechanism is an adapter fitted to the trunk lock socket to preclude forward and rearward movement of the table top.

U.S. Pat. No. 4,887,526, issued to Blatt, discloses an automobile trunk table that may be stored in the trunk of an automobile. The table is supported in the front by foldable, adjustable legs and in the back by the rim of the trunk. Further, the table is removed from and returned to the trunk by a ramp that comprises a flat frame underlying the table. Wheels fitted to the back of the table are guided by tracks to enable the table to slide up and down the ramp.

A catalogue distributed by Bass-Pro, located in Springfield, Mo., discloses a number of portable tables. The "Sierra Table" folds in the center, and has a non-adjustable, self-storing leg assembly at each end. In addition, the "Deluxe Portable Picnic Table" folds into a compact, hand-carried suitcase, while the "Rollup Table" rolls into a small bundle.

Nevertheless, although many portable tables exist, most are quite heavy, thereby making them less portable. Moreover, many existing portable tables are bulky and therefore deter the set up and break down of the tables in a defined, limited space such as the space between vehicles in a crowded sporting event parking lot. Finally, additional equipment is often necessary to provide other recreational features or items which might be desired such as coolers for beverages, portable radios, and food trays.

Accordingly, there is a need for a compact, lightweight, adjustable height table which may be used for a variety of functions including picnicking, camping, working, and in particular, tailgating at sporting events. Further, there is a need for such a portable table which may be supported by a trunk lid or adapted to function as a free-standing table, where the portable table is also designed as an all inclusive structure by including miscellaneous separate recreational items such as an insulated cooler, a portable radio, and food trays.

SUMMARY OF THE INVENTION

The present invention relates to a portable table which comprises a tray member having an internal bottom surface, an external bottom surface, opposing first and second exterior end walls and opposing exterior side walls, the internal bottom surface defining an interior chamber comprising opposing first and second interior end walls, opposing first and second interior side walls and an interior bottom surface. Additionally, a planar cover member releasibly engages the tray member such that it substantially covers the internal bottom surface and the interior chamber of the tray member, the planar cover member including a top surface and an internal storage compartment adjacent to top surface, the storage compartment having a lid which aligns with the top surface. The invention also includes means for slidably engaging the planar cover member onto the tray member and at least two leg members wherein each of the leg members is attached to opposing ends of the external bottom surface of the tray member, respectively.

It is an object of the present invention to provide a new and improved free-standing portable table which may alternatively be supported on one end by a motor vehicle or the like.

It is also an object of the present invention to provide a portable table apparatus which is lightweight, compact, adjustable in height, and easily transportable.

It is a further object of the present invention to provide a portable table which comprises a self-contained recreational apparatus thereby eliminating the need to transport additional recreational items such as beverage coolers, radios, and food trays.

It is yet a further object of the present invention to provide a portable table apparatus which can be set up and dismantled with a minimal amount of effort, as well as easily stored.

These objects and others are realized by the present invention, which is directed to a free-standing portable table apparatus which may alternatively be supported on one end by a motor vehicle. A first embodiment of the inventive portable table apparatus generally includes a tray member, a planar cover member, means for slidably engaging the planar cover member over the tray member, and two adjustable leg members attached to opposite ends of the tray member, respectively. The tray member has a bottom surface and a plurality of side ends which define a large interior chamber which is preferably insulated. The bottom surface of the tray member contains a means for draining liquid from the interior chamber.

In a second embodiment of the invention, an adjustable leg member is attached to one end of the tray member and a support bracket is mounted to the opposite end of the tray member. Such a configuration allows the bracket end of the table to be easily mounted to the tailgate or trunk area of a motor vehicle, a barbecue grill, or any other structure which can accommodate the height of the adjustable leg member. In addition, a non-adjustable support leg may be attached to the support bracket to enable the portable table to function as a free-standing device as in the first described embodiment of the invention.

In all embodiments of the invention, at least one of the plurality of side ends of the tray member defines a ledge for holding beverages along the outside of the interior chamber. Optimally, the embodiments of the portable table also include a radio recessed in one of the side ends of the tray member, a small storage compartment and tray contained within the planar cover member, and an adjustable and detachable carrying strap which is attached to the tray member.

The objects and advantages of this invention will appear more fully from the following more detailed description of the preferred embodiments of the invention made in conjunction with the accompanying drawings.

DETAILED DESCRIPTION OF THE PREFERRED EMBODIMENT

Figure 1:
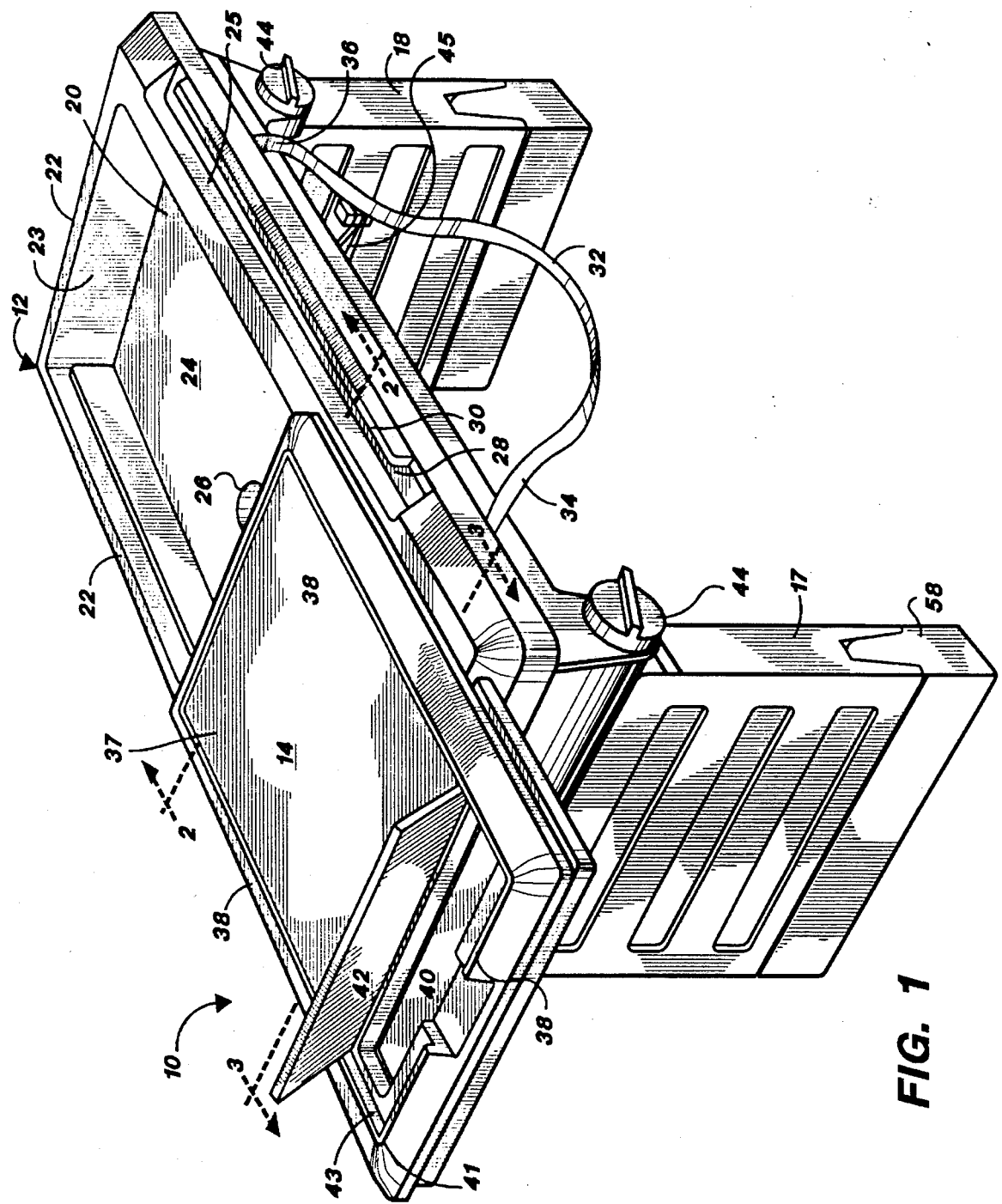
FIG. 1 is a perspective view of a preferred embodiment of a portable table in accordance with the present invention.

The embodiments of the present invention are best illustrated with reference to the accompanying figures. The same reference numbers are used throughout the several figures to identify the same features of the invention. FIG. 1 illustrates a first preferred embodiment of the portable table 10 of the present invention. Generally, the portable table 10 consists of a tray member 12, a planar cover member 14, means for slidably engaging the planar cover member 14 over the tray member 12, and first and second leg members 17,18 attached to opposite ends of the tray member 12, respectively.

Figure 2:
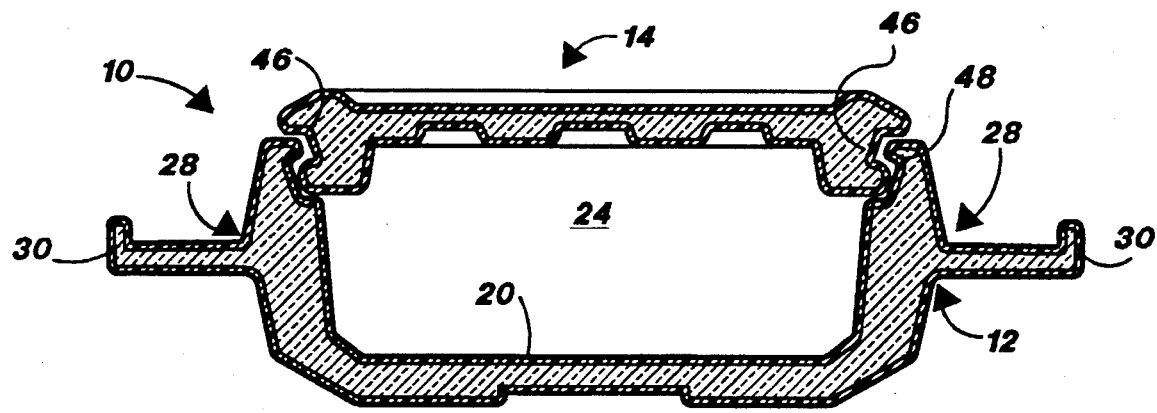
FIG. 2 is an end cross-sectional view taken along line 2—2 of FIG. 1.

The tray member 12 comprises an internal bottom surface 20, an external bottom surface 21 illustrated in FIG. 2, and a plurality of side walls 22 which form an interior chamber 24 contained in the portable table 10. Each of the plurality of side walls 22 comprises an inner side surface 23 and an outer side surface 25. The interior chamber 24 is preferably insulated on all sides with standard insulation materials such as urethane foam and air, or any other materials suitable for insulation. The interior chamber 24 is approximately five to six inches deep and has a storage area of approximately four thousand to five thousand cubic inches. Several variations in the size of the interior chamber 24 are contemplated. However, the interior chamber 24 should not be increased in size to the extent that it detracts from portability. The interior chamber 24 functions to store and cool food and beverages.

The internal bottom surface 20 of the tray member 12 may be equipped with a drain opening 26 which passes through the external bottom surface 21 to allow for water or other liquids to drain from the interior chamber 24 to an area external to the portable table 10. The drain opening 26 is particularly advantageous in draining water from the interior chamber 24 which results from the melting of ice placed within the interior chamber 24.

The tray member 12 further comprises molded beverage trays 28 which have a ledge 30 for retaining cans or bottles. The molded beverage trays 28 are preferably located on the longest opposing side walls 22 of the tray member 12. The molded beverage trays 28 can be constructed to extend from the outer side surfaces 25 of the longest side walls 22 of the tray member 12 or, alternatively, the molded beverage trays 28 may be formed by cutting out a portion of opposing side walls 22 which comprise the tray member 12. The portable table further comprises an adjustable, detachable carrying strap 32 having first and second ends 34, 36 which are attached near opposite ends of the tray member 12, respectively.

The top surface 37 of the planar cover member 14 has raised edges 38 around its perimeter thereby forming a shallow tray which prevents items from rolling off the top of the planar cover member 14. The planar cover member 14 further comprises an internal storage compartment 40 having an internal bottom surface (not shown), internal side walls (41), and a lid 42 which snaps in place to cover the storage compartment 40. Like the interior chamber 24 contained in the tray member 12, the storage compartment 40 may also be insulated.

The planar cover member 14 also includes a removable tray 43 contained within the storage compartment 40. The removable tray 43 is seated within the storage compartment 40 such that it covers the internal bottom surface (not shown) of the storage compartment as well as most of the surface area of the internal side walls 41 of the storage compartment 40. The removable tray 43 has a number of uses, some of which include: a) storing condiments, (b) storing fishing tackle during an extended fishing trip, (c) providing a dry, cold storage area separate and apart from the wet, cold storage area (interior chamber 24) for items such as breads and cheeses, (d) storing playing cards and games, and (e) storing pens, pencils, papers, and work tools for use at engineering or construction worksites.

The portable table 10 further comprises first and second leg members 17,18 which are attached to the external bottom surface 21 of the tray member 12 at opposite ends of the tray member 12, respectively. The first and second leg members 17,18 are adjustable in height and collapsible against the external bottom surface 21 of the tray member 12. Means for locking each leg member 17,18 in a vertical position with respect to the plane of the tray member 12, and alternatively releasing the leg members 17,18 so that they can be stored against the external bottom surface 21 of the tray member 12 is also provided.

The means for alternatively locking and releasing the leg members 17,18 is depicted as a rotatable knob 44 in FIG. 1. Alternatively, the tray member 12 may further comprise channels (not shown) located at opposite ends of on the external bottom surface 21 of the tray member to receive the leg members 17,18. Upper ends 39 (See FIG. 4) of the leg members 17,18 are then snapped into the channels (not shown) and are slidable engaged within the channels (not shown) such that the leg members 17,18 are rotatble about an axis.

Furthermore, support bars 45 are provided which extend from each leg member 17,18 to the external bottom surface 21 of the tray member 12 to reinforce the locked position of the leg members 17,18 and add further stability to the free-standing portable table 10. The support bars 45 and the means by which they are attached are further described with reference to FIG. 4.

A side cross-sectional view taken from a middle portion of the portable table 10 is shown in FIG. 2. FIG. 2 further illustrates a means for slidably engaging the planar cover member 14 over the tray member 12. The planar cover member 14 comprises a hollowed out track 46 located along the length of each of the longest sides of the planar cover member 14. The tray member 12 comprises a continuous lip member 48 running along a length of each of the longest sides of the tray member 12. The lip member 48 of each of the longest sides of the tray member 12 are inserted in the track 46 contained in each of the longest sides of the planar cover member 14, respectively, to slidably engage the planar cover member 14 with the tray member 12.

Figure 3:
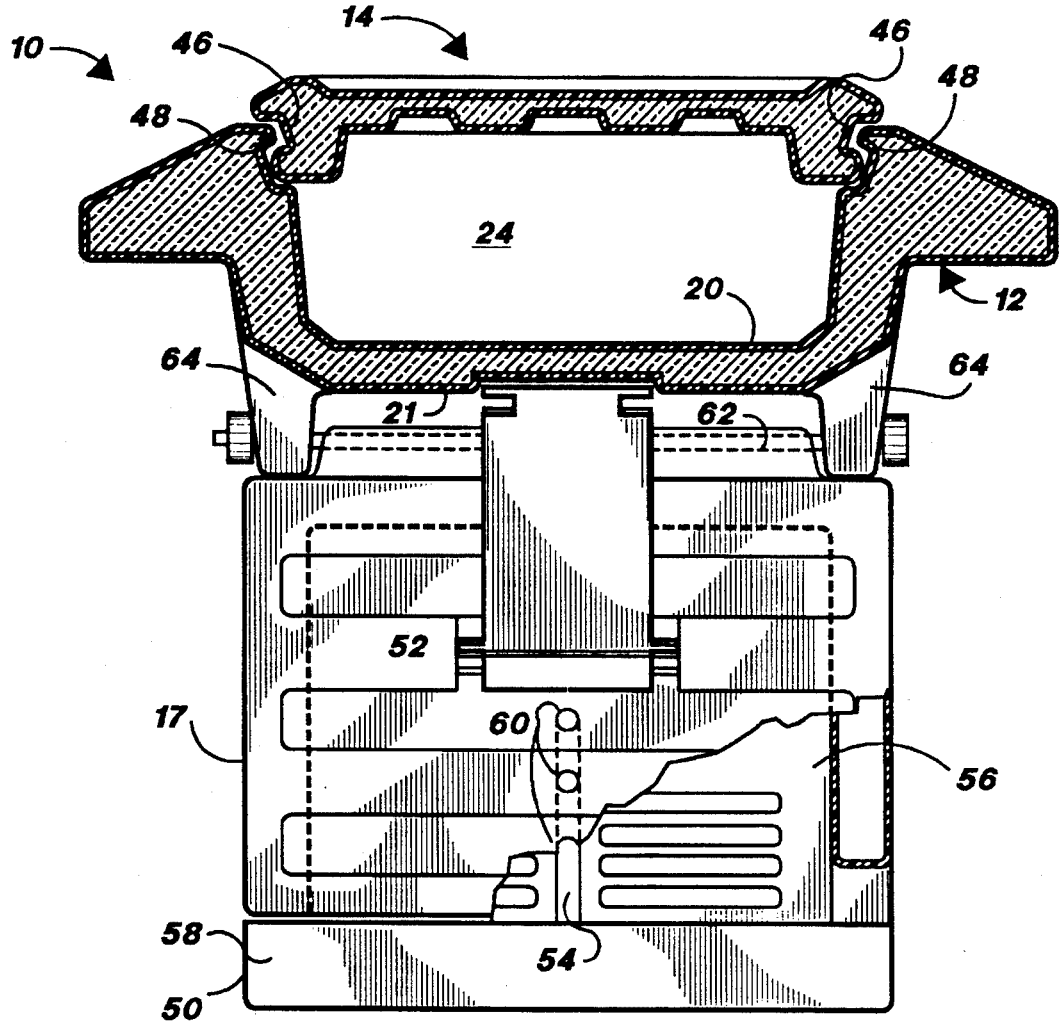
FIG. 3 is an end partially cross-sectional view of the preferred embodiment of the present invention taken along line 3—3 of FIG. 1 with part of the collapsed leg member of the present invention shown cut away.
Figure 3A:
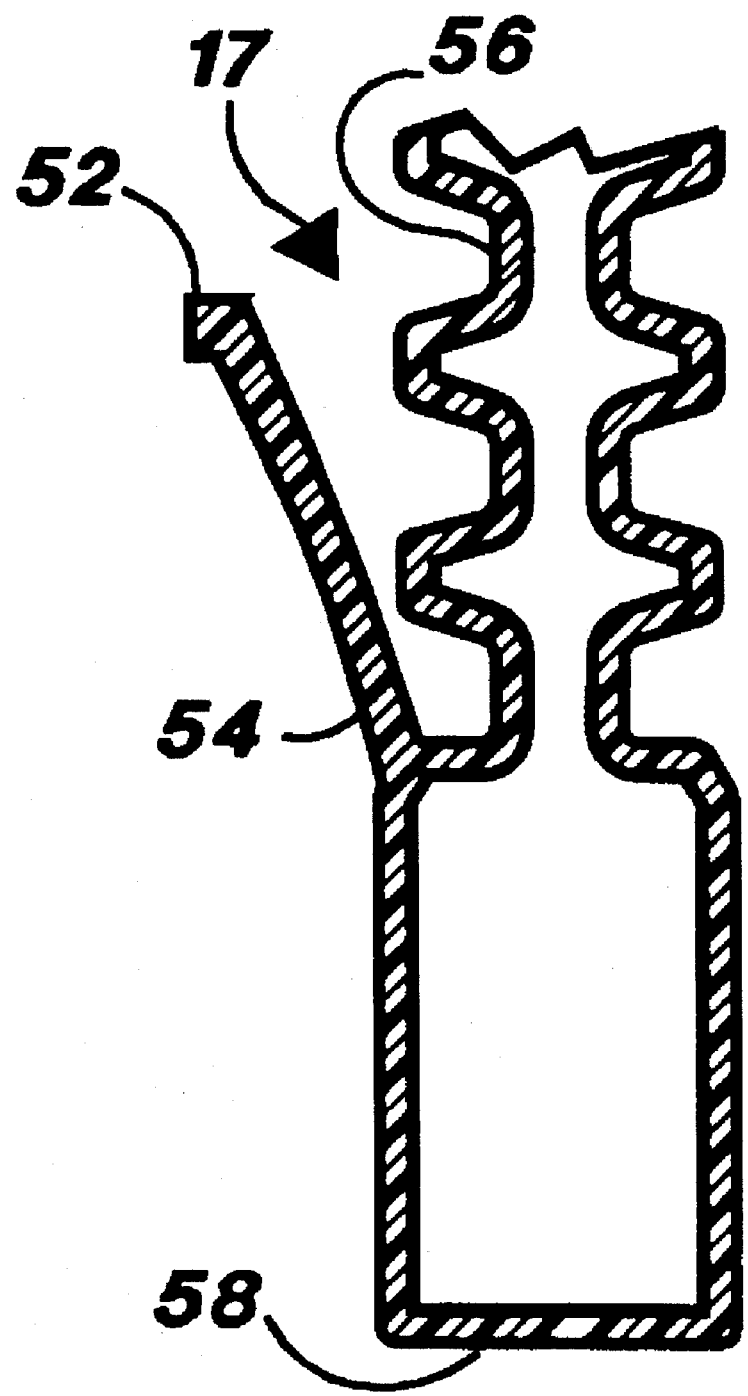
FIG. 3A is a side elevational view of the locking mechanism contained in the adjustable leg member of the portable table.

FIG. 3 depicts the locking mechanism contained within the adjustable leg members 17,18. As illustrated in FIG. 3A, the locking mechanism preferably comprises a divided solid member 50 which fits inside of the hollow leg member 17. The divided solid member 50 comprises a first, flexible arm member 54 terminating in a button member 52 a second, non-flexible arm member 56, and a base 58.

Turning now to both FIGS. 3 and 3A, the hollow leg member 17 comprises a series of openings 60 which function to lock the button member 52 of the flexible arm member 54 into place thereby securing and locking the leg member 17 at a predetermined height. The rod 62 contained within the top area of the leg member 17 and inserted through support ends 64 of the tray member 12 forms a hinge mechanism which functions to enable the leg member 17 to collapse and fold against the external bottom surface 21 of the tray member 12 for easy storage and transport.

Figure 4:
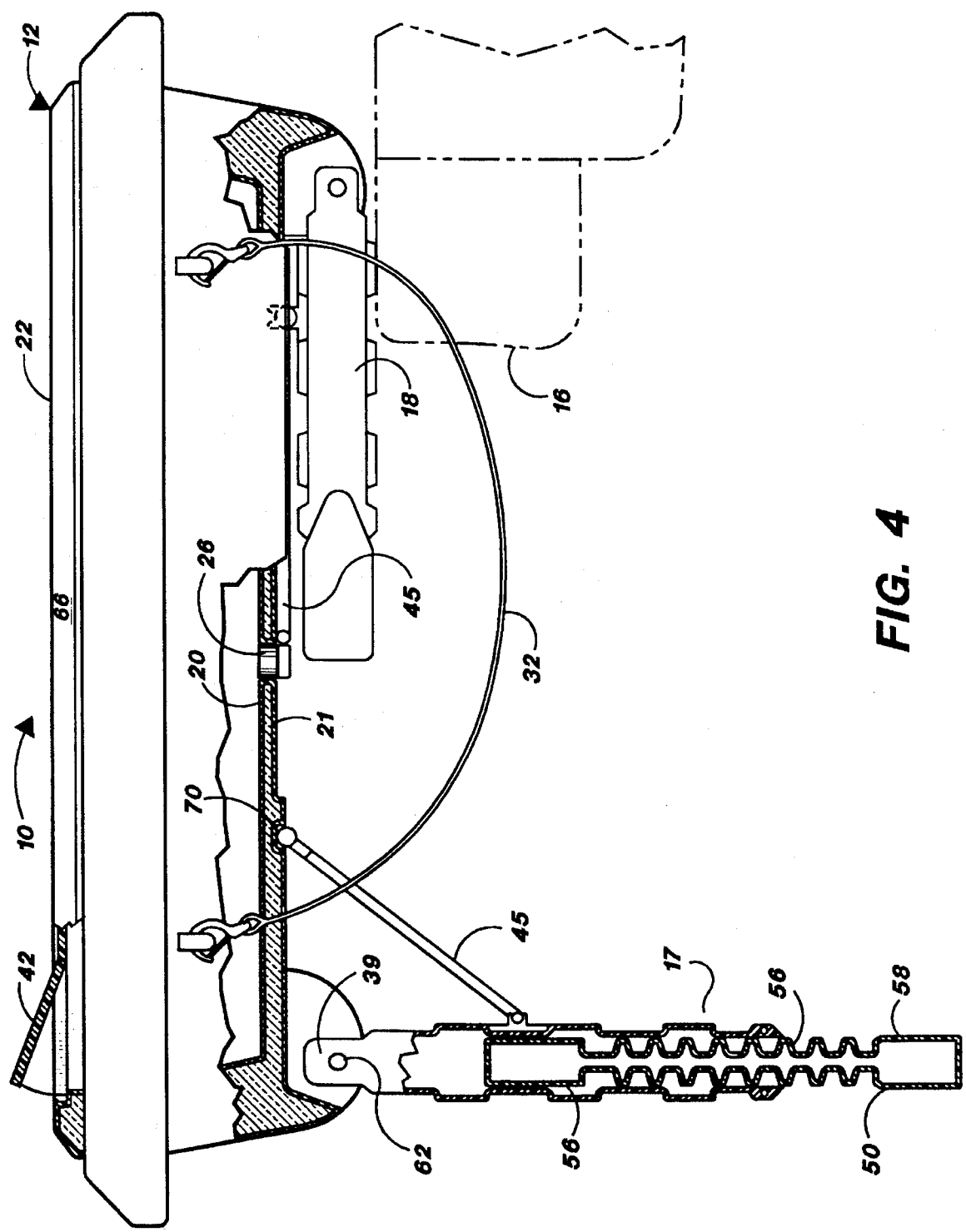
FIG. 4 is a side elevational view of the preferred embodiment of the present invention with one leg telescopically extended and defined shown cut away to show internal elements of the invention.

A side elevational view of the preferred embodiment of the portable table 10 with sections partially cut away is shown in FIG. 4. As previously described, the adjustable leg members 17,18 are each attached by a hinge mechanism on opposite ends of the portable table 10, respectively. FIG. 4 illustrates the first leg member 17 in use and the second leg member 18 in a stored position. Individual support bars 45 are associated with each leg member 17,18.

During use, the first adjustable leg member 17 is at a right angle to the table surface 66 of the portable table 10. A support bar 45 is secured in a notch 70, located in the external bottom surface 21 of the tray member 12, to lock the first leg member 17 into a right angle position. In the stored position, the second adjustable leg member 18 is stored in a plane parallel to that of the table surface 66. The support bar 45 is removed from the notch 70 in the tray member 12 and folded against the bottom external surface 21 of the tray member 12 such that it is sandwiched between the tray member 12 and the second adjustable leg member 18. A longitudinal recess area may be created in the bottom of the tray member 12 to accommodate the length of the support bar 45 when it is folded against the bottom of the tray member 12.

FIG. 4 further illustrates the second adjustable leg member 18 folded against the external bottom surface 21 of the tray member 12 and resting on the trunk area or bumper 72 of a motor vehicle. As previously described, a means for carrying the portable table 10 is provided such as a carrying strap 32 or carrying handles (not shown) molded into the sides of the tray member 12.

Figures 5, 5A:
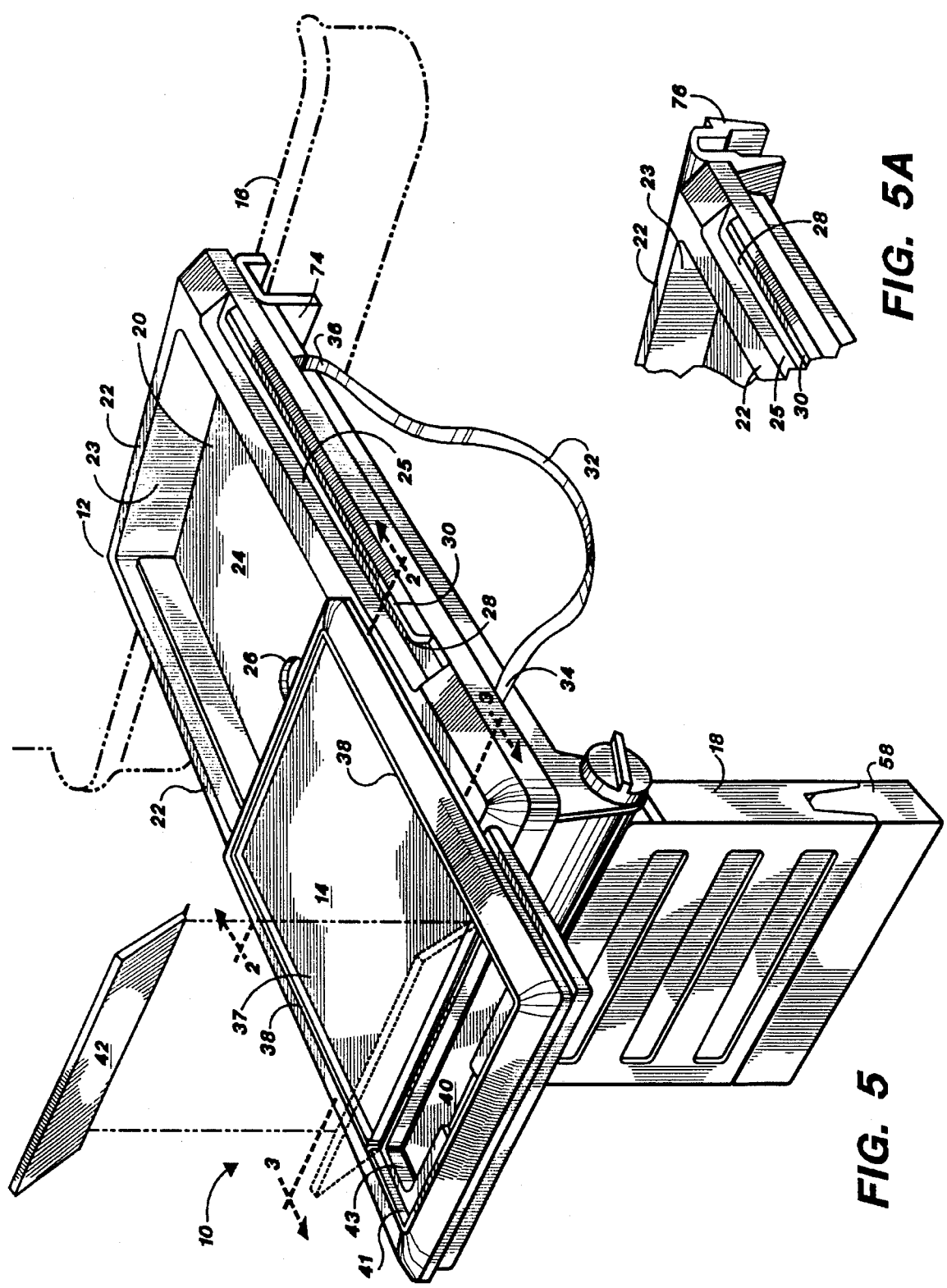
FIG. 5 is a perspective view of a second embodiment of a portable table in accordance with the present invention.
FIG. 5A is a partial perspective view of the second embodiment of the portable table showing an alternative embodiment of the bracket member.

Turning now to FIG. 5, there is shown a second embodiment of the portable table 10 of the present invention which is designed for attachment to the trunk area or bumper 16 of a motor vehicle.

The second embodiment of the portable table 10 comprises the same features as those described with respect to the first preferred embodiment with the exception of the second adjustable leg member 18. As illustrated in FIG. 5, the second adjustable leg member 18 is replaced by a support bracket 74 which, like the second adjustable leg member 18, is attached to the external bottom surface 21 of the tray member 12 along an end width of the tray member 12 which is opposite the first leg member 17. FIG. 5A illustrates a partial perspective section of the tray member 12 with an alternative embodiment of the support bracket 74 attached to a side wall 22 of the tray member 12 along an end width of the tray member 12. The support bracket 76 is designed to be seated over the trunk edge or bumper of a motor vehicle thereby securing the portable table member to the motor vehicle by snapping the support bracket 76 into place. Alternatively, a separate detachable leg member (not shown) may be snapped into the support bracket 74 and secured to form a free-standing portable table 10.

Those skilled in the art will understand and appreciate that the portable table 10, including the tray member 12, planar cover member 14, lid 42, removable tray 43, first and second adjustable leg members 17,18, and support bracket 74 may be made of any suitable plastic material, such as polyvinylchloride, polycarbonate, or other such plastic materials which may be molded and die cut as is known in the art. The carrying strap 32 may be made of any durable fabric such as canvas or nylon, or alternatively, any durable plastic material.

While preferred forms of the invention have been shown in the drawings and described, since variations in the preferred forms will be apparent to those skilled in the art, the invention should not be construed as limited to the specific forms shown and described, but instead is as set forth in the following claims.

What is claimed is:

1. A portable table comprising:

(a) a tray member having an internal bottom surface, an external bottom surface, opposing first and second exterior end walls and opposing exterior side walls, internal bottom surface defining an interior chamber comprising opposing first and second interior end walls, opposing first and second interior side walls and an interior bottom surface;

(b) a planar cover member releasably engaged to the tray member such that it substantially covers the internal bottom surface and the interior chamber of the tray member, the planar cover member including a top surface and an internal storage compartment adjacent the top surface, the storage compartment having a lid which aligns with the top surface;

(c) means for slidably engaging the planar cover member onto the tray member; and (d) at least two leg members wherein each of said leg members is attached to opposing ends of external bottom surface of the tray member, respectively.

2. The table of claim 1 wherein the means for slidably engaging the planar cover member includes a track in each of the opposing first and second interior side walls, the planar cover member further comprising opposing interfitting edges for slidable placement in each of the tracks.

3. The table of claim 1 wherein the exterior sidewalls are defined by open storage compartments.

4. The table of claim 1 further comprising means to rotate said at least two leg members about an axis.

5. The table of claim 4 further comprising means to adjustably lock said at least two leg members into a vertical position.

6. The table of claim 4 further comprising means to store said at least two leg members in folded position adjacent the internal and external bottom surfaces of the tray member.

7. The table of claim 1 wherein said at least two leg members each comprise means to adjust a height of the leg member.

8. The table of claim 1 wherein said planar cover member comprises a raised edge around a perimeter of said cover member such that said cover member forms a shallow tray.

9. The table of claim 1 wherein said tray member further comprises a drain opening which passes through said internal and external bottom surfaces of said tray member.

10. The portable table of claim 1 wherein said tray member further comprises a layer of insulation located within the exterior ends and sidewalls, and between the internal and external bottom surfaces of the tray member such that said interior chamber of said tray member is insulated.

11. The table of claim 1 further comprising a detachable and adjustable carrying strap.

12. The table of claim 1 wherein said planar cover member further comprises a removable tray contained within said internal storage compartment.

13. A portable table for use with a motor vehicle having at least one of a trunk or bumper, comprising:

(a) a tray member having an internal bottom surface, an external bottom surface, a drain opening passing through said internal and external bottom surfaces, opposing first and second exterior ends and opposing exterior sidewalls, the internal bottom surface defining an interior chamber comprising opposing first and second interior end walls, opposing first and second interior sidewalls and an interior bottom surface, the tray member also including a layer of insulation located within the exterior ends and sidewalls and between the internal and external bottom surfaces of the tray member such that said interior chamber of said tray member is insulated;

(b) a planar cover member releasably engaged to the tray member such that it substantially covers the internal bottom surface and the interior chamber of the tray member;

(c) means for slidably engaging the planar cover member onto the tray member;

(d) means for releasably attaching the first end of the tray member to the motor vehicle; and (e) a leg member hingedly attached to the second end of the tray member.

14. The table of claim 13 comprising means to attach the first end of the tray member to at least one of said trunk and said bumper.

15. The table of claim 14 wherein the means to attach the first end of the tray member comprises a bracket member extending downwardly from the first end of the tray member, the bracket member having a configuration sufficient to engage said at least one of said trunk and said bumper.

16. The table of claim 13 further comprising means to rotate said leg member about an axis.

17. The table of claim 16 further comprising means to adjustably lock said leg member into a vertical position.

18. The table of claim 16 further comprising means to store said leg member in folded position adjacent the external bottom surface of the tray member.

19. The table of claim 13 wherein said leg member comprises means to adjust a height of the leg member.

20. The table of claim 13 wherein the exterior sidewalls are defined by open storage compartments.

21. The table of claim 13 wherein said planar cover member comprises a raised edge around a perimeter of said cover member such that said planar cover member forms a shallow tray.

22. The table of claim 13 further comprising a detachable and adjustable carrying strap.

23. The table of claim 13 wherein the means for slidably engaging the planar cover member includes a track in each of the opposing first and second interior sidewalls, the planar cover member further comprising opposing interfitting edges for slidable placement in each of the tracks.

* * * * *